United States Patent [19]
Lidén et al.

[11] Patent Number: 5,628,875
[45] Date of Patent: May 13, 1997

[54] METHOD FOR CLARIFYING GREEN LIQUOR BY MONITORING THE CALCIUM CONCENTRATION IN THE SPENT LIQUOR PRIOR TO OR AT COMBUSTIONS

[75] Inventors: Jan G. Lidén, Domsjö; Leif I. Andersson, Iggesund, both of Sweden

[73] Assignee: Mo Och Domsjo Aktiebolag, Ornskoldsvik, Sweden

[21] Appl. No.: 446,852
[22] PCT Filed: Nov. 29, 1993
[86] PCT No.: PCT/SE93/01028
  § 371 Date: Jun. 5, 1995
  § 102(e) Date: Jun. 5, 1995
[87] PCT Pub. No.: WO94/12723
  PCT Pub. Date: Jun. 9, 1994

[30] Foreign Application Priority Data

Dec. 3, 1992 [SE] Sweden .................. 9203634

[51] Int. Cl.$^6$ .................. D21C 11/02; D21C 11/04
[52] U.S. Cl. .................. 162/30.1; 162/30.11; 423/DIG. 3
[58] Field of Search .................. 162/31, 30.1, 30.11; 423/123, DIG. 3

[56] References Cited

U.S. PATENT DOCUMENTS 3,366,535 1/1968 Cann .................. 162/30
4,941,945 7/1990 Pettersson .................. 162/29
5,509,998 4/1996 Strid et al. .................. 162/29

FOREIGN PATENT DOCUMENTS 9429518 12/1994 WIPO.

*Primary Examiner*—Peter Chin
*Assistant Examiner*—Dean T. Nguyen
*Attorney, Agent, or Firm*—Sughrue, Mion, Zinn, Macpeak & Seas

[57] ABSTRACT

When producing green liquor for later manufacture of cooking liquor, it is endeavoured that the green liquor shall be readily clarified and/or readily filtered. This endeavour is achieved with the present invention, which relates to a method of producing green liquor in which waste liquor separated from cellulose pulp and derived from a cooking stage and possibly from one or more bleaching stages is worked up including known treatment stages such as evaporation, combustion, smelt dissolving and other green liquor preparation, and in which a calcium containing chemical is added to the waste liquor prior to combustion, or is added at the combustion of the waste liquor. The method is characterized in that carbon deriving from the smelt is caused to equal at most 0.3 weight promillage, calculated on the smelt after combustion, when and after dissolving the smelt in liquid; and in that the addition of calcium is controlled so that the amount of calcium added together with the amount of calcium that is already present will equal at least ¾ of the amount of magnesium present in the waste liquor calculated in mol; and in that the addition is at most 10% by weight of the sodium plus sulphur present in the waste liquor.

9 Claims, 1 Drawing Sheet

METHOD FOR CLARIFYING GREEN LIQUOR BY MONITORING THE CALCIUM CONCENTRATION IN THE SPENT LIQUOR PRIOR TO OR AT COMBUSTIONS

TECHNICAL FIELD

The present invention relates to a method of producing green liquor having good clarifying and/or filtering properties in chemical recovery in sulfate and sulfite pulp mills. The prepared (clarified and/or filtered) green liquor is used in both sulfate and sulfite pulp mills to produce fresh cooking liquor with the aid of which ligno-cellulosic material, wood chips for instance, is digested to cellulose pulp. According to the sulfate method, green liquor is converted to white liquor (fresh cooking liquor) by means of a causticizing process. The predominant chemicals in white liquor are sodium hydroxide and sodium sulfide in that order. Since sodium is included in both of these chemicals, sodium is designated as the base in the cooking liquor. In the case of the sulfite method, fresh cooking liquor is produced from green liquor in another way. The predominant chemicals in a sulfite cooking liquor which has sodium as the base are $NaHSO_3$ and $SO_2$. One speaks of free and bound $SO_2$ in this connection.

BACKGROUND ART

When manufacturing sulfate pulp for instance, lignocellulosic material, e.g. wood, finely divided to chips, and cooking liquor are charged to a digester. The cooking liquor may consist entirely of white liquor, i.e. fresh cooking liquor, or may consist of white liquor that has been mixed with a given quantity of cooking liquor that has already been used, i.e. waste cooking liquor. The chemicals present in the cooking liquor are caused to react with the wood chips at elevated temperature and elevated pressure. Subsequent to the cook, the resultant cellulose pulp is separated from the used cooking liquor, i.e. the waste cooking liquor, in diverse washing and/or pressing stages, these material flows being treated in the manner described below.

The cellulose pulp is normally screened and then subjected to at least one bleaching process as a rule. The pulp is normally bleached in several stages, often with intermediate alkali stages (extraction treatments). The pulp is normally washed after each bleaching stage, resulting in bleaching waste liquors. Waste liquor that derive from treatment stages in which the bleaching agents used contain no chlorine, such as oxygen, peroxide and ozone, are normally passed in counterflow to the pulp. treatment chain and finally mixed with the cooking waste liquor. The same applies to waste liquors that derive from alkali stages. When bleaching is effected with chlorine-containing bleaching agents, such as chlorine, hypochlorite and chlorine dioxide for instance, it is not normally possible to recover these bleaching waste liquors, but these liquors must be discharged to the recipient.

As above mentioned, the waste cooking liquor, also referred to as black liquor, may be mixed with recycled bleaching waste liquor. Irrespective of whether the black liquor consists exclusively of cooking waste liquor or of a mixture thereof, the black liquor is treated (for instance evaporation) so as to increase its solids content to 60–70% for instance. This liquor is then referred to as concentrated waste liquor. The concentrated waste liquor is burned in a recovery boiler in which the organic constituents of the concentrated waste liquor are converted essentially to carbon dioxide, water and energy, while the inorganic constituents of the concentrated waste liquor form a smelt in the bottom of the recovery boiler. The smelt is conducted along a drain or spout down into a soda dissolver, where the smelt is dissolved in weak liquor and/or water. The resultant solution is green liquor. The smelt is mainly comprised of sodium carbonate and sodium sulfide, which are both readily dissolved in water. The smelt also includes other elements, which originate mainly from the lignocellulosic material used as starting material in the digestion (cooking) process. Calcium and magnesium predominate among these other elements although iron, manganese, aluminium and silicon are also present in readily measured quantities. A number of other elements are also present in trace quantities (less than 1 mg per liter of green liquor). Distinct from the two sodium compounds, the aforesaid elements are insoluble or only partially soluble in green liquor. In sulfate pulp mills in which oxygen bleaching is employed and/or other bleaching processes with chemicals that do not contain chlorine are employed, meaning that all the bleaching waste liquor from this bleaching stage/these bleaching stages or a part of said waste liquor is passed back to the cooking waste liquor, primarily the magnesium content of the smelt increases. In turn, this is caused by the addition of some kind of magnesium compound as a protector in the oxygen and peroxide bleaching stages. Magnesium can also be added in pretreatment stages to the mentioned bleaching stages. The smelt also contains a certain amount of unburned carbon (soot).

The aforesaid insoluble or not readily soluble substances are present in the green liquor produced in the smelt dissolver in the form of solid particles. These particles must be removed from the green liquor to the greatest possible extent, and the removal of said particles in the form of sludge can be effected in several ways, as will be described in more detail further on.

The clarified green liquor is passed to a lime-slaker where quicklime, i.e. calcium oxide (CaO), is added to the green liquor. The calcium oxide is slaked in the green liquor and converted to calcium hydroxide ($Ca(OH)_2$), which in turn reacts with the sodium carbonate content of the green liquor, to provide a solution of sodium hydroxide and sodium sulfide and a calcium carbonate ($CaCO_3$) precipitate, so-called lime mud. The lime mud is filtered off from the white liquor obtained by the described process, designated causticizing, and washed, preferably with hot water, to recover soluble compounds. The resultant weak liquor is normally passed to the aforementioned soda dissolver (smelt dissolver). The washed lime mud ($CaC0_3$) is burned in a rotary furnace (lime kiln) to produce quicklime (CaO), which is returned to the lime-slaker to causticize the green liquor.

As earlier mentioned, the obtained white liquor is used as fresh cooking liquor for the digestion of newly charged lignocellulosic material.

If the earlier mentioned separation of sludge from the green liquor is insufficient, magnesium, aluminium, iron, manganese and other transition metals etc. will be concentrated in and contaminate the lime mud, which is formed in the lime-slaker and the causticizing vessels. The calcium carbonate content of the lime mud and also the content of free calcium oxide in the lime mud re-burned in the lime kiln will therewith fall progressively as the calcium oxide/lime mud circulates in the process, the so-called lime cycle. This makes it necessary to replace continually parts of the material in the lime cycle with pure limestone.

A typical method of removing the mentioned sludge is to sediment the sludge in a so-called green liquor clarifier. It is necessary to maintain the surface load on these clarifiers at a low level. A suitable green liquor input is 0.5 meters/hour. The cleaning result normally varies widely and the amount of sludge (contaminants) remaining in the liquor is rarely less than 50 mg per liter of cleansed (clarified) green liquor. When large volumes of green liquor are to be cleansed, about 4 m$^3$ per tonne of pulp, very large clarifiers are required to achieve acceptable cleansing of the green liquor.

Attempts have been made to use conventional filters, such as pressure filters, vacuum filters, plate filters and drum filters instead of clarifiers, with the intention of partly decreasing the space requirements and investment costs and partly to achieve more effective cleansing of the Green liquor. However, it has been found difficult to filter green liquor instead of clarifying the same. The filters often become blocked and clogged too quickly, meaning that the various filters must be switched off and cleansed much too often.

The Swedish Patent Application 8700549-2 (456 254) describes a method which enables the aforesaid filters to be used to cleanse the Green liquor. According to this patent application, there is added to the unclarified green liquor while stirring a small amount of quicklime, namely 0.5–10%, preferably 1–3%, of the amount of quicklime required to fully causticize the green liquor, just prior to filtering (settling out) the Green liquor to remove the solid particles. According to the patent application, this procedure enables the green liquor to be filtered more effectively.

It is proposed in the Swedish Patent Application 9003697-1 (467 465) that a solution of slaked lime and green liquor in mixture is supplied to the unclarified green liquor instead of quicklime (in solid form) in precisely the same location. This liquid flow is comprised of part of the flow of slaked lime and green liquor that passes from the lime slaker to the causticizer(s) as a matter of routine. According to the patent application, this procedure will also enable the sedimentation and filtering properties of the green liquor to be improved.

Flocculating chemicals, an anionic polyacrylamide for instance, are also used to facilitate the separation of sludge from green liquor. Full scale tests carried out by us with this additive chemical show that the chemical can have a positive effect during periods in which the sludge can be separated relatively easily in the clarifier. This chemical provides no advantages during those periods in which sludge cannot be readily separated. When making a comparison between the occasion when a flocculating chemical is introduced and the occasion when no such chemical is introduced, no difference is noticed in the average value of the sludge content of the clarified green liquor over a long operational period, i.e. over a month or longer.

DISCLOSURE OF THE INVENTION

Technical Problem

It will be seen from the aforegoing that improved sludge sedimentation is sought for in the manufacture of green liquor, in comparison with present day situation, and also to produce the smallest possible sludge volume.

The Solution

The present invention provides a solution to the aforesaid problem and relates to a method of producing green liquor which has good clarifying and/or filtering properties in chemical recovery in sulfate and sulfite pulp mills, wherein waste liquor separated from cellulose pulp and deriving from a cooking stage and possibly one or more bleaching stages is worked up, including known treatment stages such as elevating solid content, combustion, smelt dissolving and other green liquor preparation, and including that calcium containing chemical is added to the waste liquor prior to the combustion, or is added in the combustion of the waste liquor, characterized in that carbon originating from the smelt is caused to be present in an amount of at most 0.3 weight permillage, calculated on the smelt after combustion, when and after dissolving the smelt in liquid; and in that the addition of calcium is controlled so that the amount of calcium added together with the amount of calcium already present in the waste liquor will reach to at least ¾ of the magnesium present in the waste liquor, calculated in mol; and in that the additon is at most 10% by weight of the sodium plus sulphur present in the waste liquor.

The amount of carbon present when dissolving the smelt, in weak liquor for instance, will often lie beneath the aforesaid limit value. One condition in this regard is, among other things, that the amount of waste liquor to be combusted is adapted to the capacity of the recovery boiler, so as not to overload the recovery boiler. In the majority of pulp mills of this kind, it is not necessary to take separate measures in order to maintain the carbon content at a low level. In this case, there is automatically obtained a green liquor which can be readily clarified when taking the aforesaid measures, i.e. when adding a calcium containing chemical to the waste liquor in an amount which is dependent on the amount of magnesium present in the waste liquor. When the recovery boiler is overloaded, a carbon content in the smelt which is too high will be obtained. In such cases, the aforedescribed measures will have no effect, because the green liquor will remain difficult to clarify. In such cases, it may be necessary to treat the smelt after it has left the recovery boiler and prior to dissolving the smelt in weak liquor and/or water in a manner to reduce its carbon content to beneath the aforesaid limit value.

For instance, with this in mind it is beneficial to extend the path along which the smelt is in contact with ambient air, to the greatest possible extent. Regarding the carbon amount the important thing is what the carbon content of the green liquor in and after dissolving the smelt amounts to. It would appear that something happens to the carbon as the smelt strikes the surface of the liquid, i.e. the carbon amount is lowered markedly at this location. Since the smelt is dissolved in weak liquor and/or water and forms green liquor, it is not possible to put the amount of carbon that remains and forms an impurity or contaminant in the green liquor in relation to something that has passed into solution, thereby placing the amount of carbon in relation to the original smelt from the aspect of calculation, i.e. when it leaves the recovery boiler and is located in the drainage pipe.

The inventive method can be applied to pure cooking waste liquors, i.e. cooking waste liquors which have not been mixed with bleaching waste liquors. Furthermore, the inventive method can be applied advantageously with waste liquors that are comprised of a mixture of cooking waste liquor and bleaching waste liquor, and the more closed the pulp mill is, the better the invention can be applied. This applies particularly to sulfate pulp mills. An increase in the extent to which the pulp mill system is classed will often lead to a higher magnesium content of the waste liquor, among other things. It is preferred to adapt the addition of a calcium containing chemical to the waste liquor so that the amount of calcium that is added to the system together with the amount of calcium that is already present in the waste liquor will equal at least the amount of the magnesium present in the waste liquor, calculated in mol. The upper limit of the calcium addition is not equally as critical, although it may, for instance, reach at most 5% by weight of the amount of sodium plus sulphur present in the waste liquor. Excellent results have been achieved when practicing the inventive method on a full scale, in which the total amount of calcium in the waste liquor was controlled to equal from one and a half to two times the amount of magnesium present in the waste liquor, calculated in mol.

A large number of chemicals that contain calcium can be delivered to the waste liquor when practicing the inventive method. Examples of such chemicals are calcium chloride, calcium nitrate, calcium oxide and calcium hydroxide. Calcium chloride and calcium nitrate, however, are less suitable because undesirable types of ion (chloride or nitrate) would then be supplied to the process. A particularly preferred chemical is calcium carbonate, for instance, in the form of lime mud present in the process, and more specifically in the lime cycle. The lime mud added to the waste liquor may be in the form of a slurry or may be completely dry, for instance in the form of dust extracted from the electro-filter that is normally placed adjacent the lime kiln.

The calcium containing chemical, for instance the lime mud, may be delivered to the waste liquor at any location prior to being burned. Although it is unsuitable in practice to add the chemical in the actual recovery boiler itself, it is nevertheless fully possible. According to one preferred embodiment of the invention, the chemical is added to the waste liquor subsequent to having evaporated the liquor to form concentrated waste liquor, i.e. just prior to combustion of the waste liquor in the form of concentrated or thick liquor. The chemical may be added to the waste liquor to particular advantage in the dust mixer, where sodium sulfate is also supplied to the concentrated liquor, and in an optional concentrated liquor cistern located immediately upstream of the dust mixer, which in turn is located in direct connection with the recovery boiler. The afore-said addition of a calcium containing chemical to the waste liquor does not exclude the additions of other types of chemicals to the waste liquor, nor yet excludes the addition of said chemicals to the waste liquor in any other position in the green liquor manufacturing process. On the contrary, it is fully possible to combine this addition in the afore-described manner with, for instance, the addition of one or more flocculating agents directly to the unclarified green liquor.

Advantages

The method according to the invention leads to a readily clarified and readily filtered green liquor. Thus, the existing clarifiers and/or filters of pulp mills will always suffice in achieving the desired production of cellulose pulp. In other words, the invention avoids reduced pulp production caused by problems occuring during manufacture of green liquor and thereafter white liquor for use in digesting lignocellulosic material.

Partly investment costs and partly space requirements for cleansing green liquor can be kept low in the construction of new pulp mills. In the case of a sulfate pulp mill, an easily clarified and easily filtered green liquor results in a clean lime stock/lime mud, which in turn leads to such advantages as reduced damming in the lime kiln, improved lime mud washing and a reduced need to clean the apparatus used to separate lime mud from the white liquor.

BEST MODE OF CARRYING OUT THE INVENTION

Figure 1:
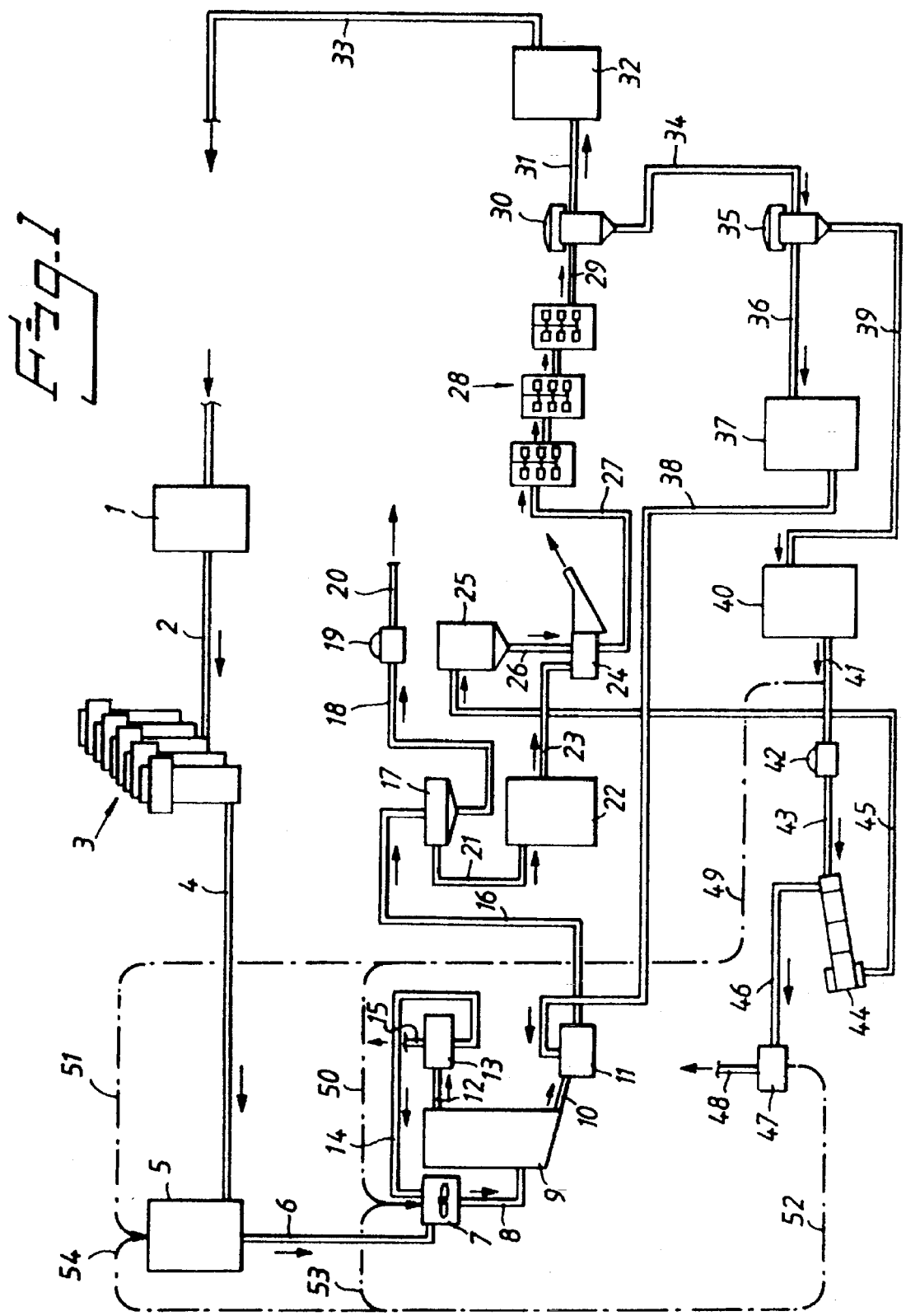
In FIG. 1 the chemical recovery system in a sulfate pulp mill is illustrated schematically, partly in accordance with conventional technique and partly supplemented with preferred embodiments of the inventive method.

Above all preferred embodiments of the inventive method and also the conventional technique will now be described with reference to FIG. 1 in conjunction with a more detailed description of the various conditions connected with the inventive method. The description is ended with a working example described with reference to FIG. 1.

In FIG. 1 the chemical recovery in a sulfate pulp mill is shown schematically. The different treatment stages for firstly the lignocellulosic material (the wood chips) and thereafter the cellulose pulp—the fibre part—have been excluded for reasons of space and clarity. Cooking waste liquor, normally mixed with waste liquor from one or more bleaching stages, is passed to the collecting cistern 1. In this position of the system, the waste liquor (thin liquor) will normally have a solids content of 16–20% by weight. The waste liquor is passed through a conduit 2 to an evaporator plant 3, in which the solids content of the waste liquor is increased to 60–70% by weight and the waste liquor is now referred to as a concentrated or thick liquor. The concentrated liquor is then passed through a conduit 4 to the concentrated liquor cistern 5, from where the liquor is passed through a conduit 6 to a dust mixer 7, which is provided with a stirrer. Sodium sulfate, in the form of electro-filter dust (as explained below) is supplied to the concentrated liquor in the dust mixer 7.

Prior to delivering the concentrated liquor to the dust mixer 7, a part flow of concentrated liquor has been pumped to the mill section in which chlorine dioxide is produced and there supplied with sodium sulfate formed during this production of chlorine dioxide. This is done in order to cover the chemical losses that occur in pulp manufacture (not shown in the drawing).

The concentrated liquor laden with sodium sulfate is passed through the conduit 8 to the recovery boiler 9, where it is combusted. The organic components of the concentrated liquor are converted to carbon dioxide, water and energy. The non-combustible and non-volatile components of the concentrated liquor form a smelt in the bottom of the recovery boiler. The smelt runs through a smelt spout 10 down into a smelt dissolver (soda dissolver) 11. Part of the sodium content of the concentrated liquor leaves the boiler together with the flue gases through the conduit 12 and to the electro-filter 13, where it is collected in the form of sodium sulfate, which is passed to the aforesaid dust mixer through the conduit 14. The flue gases, freed from essentially all sodium sulfate, are released to atmosphere through the conduit 15.

The smelt is dissolved in the smelt dissolver 11 in weak liquor (as described below)and possibly water, to form unclarified green liquor. This liquor is passed to the clarifier 17 through the conduit 16. The insoluble particles present in the green liquor form a sludge and the major part of the sludge settles in the clarifier 17 and falls to the bottom thereof, from where it is removed through the conduit 18 to a filter 19 for washing and dewatering of the sludge. Alternatively, a filtration plant can be installed in position 17. Furthermore, in series connected clarifier and filter can be used. The sludge is discharged from the system through a conduit 20. The clarified (and/or filtered) green liquor is discharged to a cistern 22, through the conduit 21. The green liquor is then passed through the conduit 23 to the lime slaker 24, where it is mixed with calcium oxide (quicklime) delivered from the lime silo 25, through the conduit 26.

Insoluble lime, i.e. in solid form, is removed from the lime slaker and discharged from the system (as shown by the arrow). The calcium oxide reacts with water and with the carbonate ions of the green liquor in the lime slaker, so as to form a lime mud, i.e. calcium carbonate, and hydroxide ions. The chemicals concerned are conveyed to the causticizing vessels 28, through the condigit 27, where said reactions continue until equilibrium is reached. The chemical mixture is then passed through the conduit 29 to the filter 30, where the formed lime mud is separated from the liquid phase, i.e. the white liquor. The cleansed white liquor is passed through the conduit 31 to the collecting cistern 32, from where the white liquor is conveyed to the digester house through the conduit 33, as required.

The lime mud is conveyed through the conduit 34 to the wash filter 35. During its passage to the wash filter 35, the sludge is repeatedly diluted with essentially pure, hot water (not shown). The resultant wash liquid, referred to as weak liquor, is passed through the conduit 36 to the weak liquor tank 37, from where it is later conveyed to the soda dissolver 11, through the conduit 38. The smelt is dissolved in the soda dissolver 11 in the weak liquor (optionally together with water) to provide unclarified green liquor. The partially washed lime mud is transported through the conduit 39 to a lime mud silo 40. During its passage, the lime mud is diluted with essentially clean water, to form a pumpable slurry (not shown). The lime mud is then passed through the conduit 41 to a further wash filter 42. Essentially clean, hot water is applied to that drum filter and to the lime mud web moving on it. Wash liquid collected on the bottom of the filter is passed to the weak liquor tank 37 where it is admixed with and forms part of the weak liquor (these two mentioned procedures not being shown). The ready washed lime mud is passed through the conduit 43 to the lime kiln 44, where the lime mud ($CaCO_3$) is calcined and converted to quicklime (CaO). The quicklime is passed through the conduit 45 to the lime silo 25. The flue gases Generated in the lime kiln are collected and passed through the conduit 46 to an electro-filter 47. A dust consisting essentially of lime mud ($CaCO_3$) is collected in the filter. The cleansed flue gases are discharged to atmosphere through the conduit 48.

That which has hitherto been described with reference to FIG. 1 involves production of green liquor and subsequent production of white liquor in accordance with conventional technique.

Various embodiments of the inventive method will now be described with reference to FIG. 1. At least two conditions must be fulfilled in order to produce an easily clarified and/or easily filtered green liquor.

One condition is, that the residual amount of carbon is kept on a relatively low level when the smelt comes into contact with the liquid surface and is dissolved in the weak liquor. The amount of carbon will be at most 0.3 weight promillage calculated on the original smelt. Unless the recovery boiler is overloaded, i.e. excessive concentrated liquor is delivered to the boiler in relation to its capacity, the carbon content of the smelt will normally, although not necessarily, lie at a sufficiently low level. If this is not the case, after leaving the recovery boiler 9 the smelt must be treated in a manner which will ensure that the smelt will contain the aforesaid low level of carbon as the smelt is dissolved in the weak liquor. Measures which lead to continued combustion of the carbon in this location represent a workable way.

The second condition is that a calcium containing chemical is supplied to the waste liquor prior to combustion, in any appropriate location. The calcium containing chemical is supplied in a quantity such that the amount of calcium supplied together with the amount of calcium that is already present in the waste liquor will constitute a certain smallest quantity that stands in relation with the amount of magnesium present in the liquor. Alternatively, instead of supplying calcium to the waste liquor, the chemical concerned may be supplied in the combustion of the waste liquor (the concentrated liquor) in the recovery boiler.

It will be understood from this that the waste liquor must be analyzed at regular intervals, primarily with regard to its magnesium and calcium content. Prior to forming the smelt, the total amount of calcium present shall reach at least ¾ of the amount of magnesium calculated in mol, and the preferred total amount of calcium is at least the same as the amount of magnesium calculated in mol. Splendid results have been obtained with a total calcium amount that corresponds to one and a half times the amount of magnesium calculated in mol, as will be evident from the following working example. The upper limit of the amount of calcium added is not as critical as the lower limit. A suitable maximum limit with regard to the calcium is 10% by weight of the sodium plus sulphur present in the waste liquor, and a preferred highest amount is 5% by weight.

As will be clearly seen from the aforegoing, the calcium containing chemical is preferably comprised of lime mud, i.e. calcium carbonate. The form of the lime mud and the location in which it is preferably delivered to the waste liquor will be evident from the conduits shown in chain lines in FIG. 1.

According to one preferred embodiment of the invention, a part flow of the lime mud slurry is taken from the conduit 41 and conveyed through conduits 49 and 50 to the dust mixer 7, where the slurried lime mud is mixed into the concentrated liquor in a quantity earlier established in detail. Alternatively, the sludge slurry may be conveyed through the conduits 49 and 51 to the cistern 5, where the lime mud slurry is admixed with the concentrated liquor. It is fully possible to add the lime mud slurry at both of these locations.

According to another, particularly preferred embodiment of the invention, lime mud is taken out from the electro-filter 47 in the form of dry electro-filter dust and is conveyed through the conduits 52 and 53 to the dust mixer 7, where the lime mud is admixed with the concentrated liquor. Alternatively, the lime mud is conveyed through the conduits 52 and 54 to the cistern 5, where the lime mud is admixed with the concentrated liquor. It is also possible to add lime mud in a dry state at both of these locations. The advantage of adding completely dry lime mud is that no additional water is supplied to the concentrated liquor obtained from the thin liquor by evaporation. Evaporation is a high energy requiring process and it is endeavoured to maintain the highest possible solids content (dry substance content) in the concentrated liquor, so as to increase its calorific value. It is therefore beneficial to avoid adding any water at all to the concentrated liquor.

Although the lime mud addition locations shown in the FIG. 1 are the preferred locations, it will be understood that a large number of other locations are possible. For instance, the locations 1, 2, 4 and 6 are possible addition locations.

Although lime mud is preferred as the addition chemical, it will be understood that in principle any calcium containing chemical whatsoever can be added. It is the calcium ion (cation) which is important in this respect and not to which anion it is bound. However, there are other reasons which speak against the introduction of certain anions into the chemical recovery system. It will be understood from the aforegoing that it is not necessary to add solely one calcium containing chemical, but that it is, of course, possible to add calcium containing chemicals in mixture.

As earlier explained, the smelt which runs through the chute or spout 10 contains mainly the two chemicals sodium carbonate and sodium sulfide. Since both of these chemicals are easily dissolved in water and weak liquor, it means that the green liquor will also consist mainly of these two chemicals. The smelt, however, also contains a number of chemicals which are not readily dissolved or which are insoluble in water and weak liquor. These chemicals (some in particle form) form a sludge in the newly produced green liquor. As earlier described, the major part of the sludge is removed in the clarifier 17 and/or in a filter (not shown). When studying the sludge in the newly produced (unclarified) green liquor, we have observed that the surface chemical properties of the sludge appear to be important as to how readily the sludge can be separated from the green liquor. This becomes obvious when green liquor is removed from the conduit 16 or upon introduction into the clarifier 17 and poured in transparent vessels while observing the clarifying sequence solely with the eyes. The particles in the not readily clarified sludge repel one another, whereas the particles in the readily clarified sludge form spontaneously sinking agglomerates. The addition of a given amount of calcium containing chemical in the recovery boiler at the latest, in accordance with the invention, would appear to contribute strongly to the spontaneous formation of sinking particle agglomerates.

A list of chemicals that are undesirable in green liquor and which are included in the sludge has been presented in the aforegoing. After a working period of two or more weeks with poor green liquor clarification, there is found in the mill a lime stock/lime mud stock which has been enriched in these undesirable chemicals, i.e. which are present in the sludge that could not be separated from the green liquor prior to the causticizing stage. After a period of one or more weeks during which the green liquor sludge was effectively separated by means of the inventive method, there was obtained a lime stock/lime mud stock in the mill that contained only small amounts of these chemicals.

EXAMPLE 1

The inventive method has been tested on a full scale in a sulfate pulp mill.

Green liquor—and white liquor—were produced fully in accordance with the basic layout of FIG. 1 over a period of 59 calendar days. Green liquor was produced during the following 19 calendar days while applying the inventive method. As illustrated in FIG. 1, a given quantity of lime mud was taken out in the form of a slurry having a dry solids content which varied between 35 and 40%, and was conveyed through the conduits 49 and 50 to the dust mixer 7, where the lime mud was admixed with the concentrated liquor with the aid of a propeller agitator. Samples taken randomly from the concentrated liquor entering the dust mixer were analyzed with regard to their magnesium and calcium contents, among other things. The lime mud addition was adjusted so that the sum of the calcium already present in the concentrated liquor and the calcium added to the system in mol was about 1.5 times the magnesium present in the concentrated liquor. This meant that the lime mud addition was about 1 g of calcium carbonate for each kg of concentrated liquor. During the two test periods, the carbon content of the green liquor, i.e. when the smelt was dissolved in the weak liquor, was throughout so low as to eliminate clarification problems on the basis of excessively high carbon contents.

It was found that the sludge in the unclarified green liquor, i.e. in the locations 11, 16 and 17, changed in character about two hours after commencing the addition of lime mud to the concentrated liquor. The earlier black flocks were converted to a greyer colour and smaller particles and these particles gave a sludge that was much more compact than the sludge earlier obtained. This was achieved despite the fact that the sludge weight increased markedly after adding the lime mud. The sludge content of the clarified green liquor was determined on a daily oasis, with the exception of Saturdays and Sundays. The results achieved are set forth in Table 1 below.

TABLE 1

| | Accord. to conv. technique | | Accord. to inventive method | |
|---|---|---|---|---|
| | Mean value | Spread | Mean value | Spread |
| Sludge content of clarified green liquor mg/l | 133 | 16 | 39 | 5 |

The spread (s) around the average value is determined by the formula $s=\sqrt{\Sigma(y-\eta)^2/N}$, where y is the measurement index of the individual measuring point, $\eta$ is the population average value and N is the number of measuring points.

As will be seen, the sludge content of the clarified green liquor, i.e. the amount of sludge that accompanies the green liquor into the causticizing stage when practicing the inventive method is less than one third of the sludge content of clarified green liquor produced in accordance with the conventional technique. The advantages afforded hereby have been exemplified earlier in this document.

We claim:

1. A method of producing green liquor having good clarifying and/or filtering properties in chemical recovery in sulfate and sulfite pulp mills, comprising:
   (a) collecting waste liquor separated from a cellulose pulp, derived from a cooking stage, or derived from a cooking stage and a bleaching stage, the waste liquor comprising calcium, magnesium, sodium and sulfur;
   (b) treating the waste liquor by
   (i) elevating solid content to form a concentrated waste liquor,
   (ii) combusting the concentrated waste liquor to form a smelt comprising carbon,
   (iii) adding a calcium containing chemical to the waste liquor before or during the combusting of the waste liquor wherein,
   the amount of the calcium containing chemical is adjusted so that the amount of calcium added plus the amount of calcium already present in the waste liquor equals at least ¾ of the amount of magnesium present in the waste liquor calculated in mol and is at most 10% by weight of the sodium plus the sulphur present in the waste liquor; and
   (iv) dissolving the smelt to form a green liquor wherein the carbon formed from the smelt is at most 0.03 percent by weight, calculated on the smelt after combustion, when and after dissolving the smelt in liquid.

2. The method according to claim 1 wherein
the amount of the calcium containing chemical is adjusted so that the amount of calcium added plus the amount of calcium already present in the waste liquor is equal to at least the amount of magnesium present in the waste liquor calculated in mol and is at most 5% by weight of the sodium plus the sulphur present in the waste liquor.

3. The method according to claim 2 wherein the calcium containing chemical is added immediately prior to combusting the concentrated waste liquor.

4. The method according to claim 3 wherein the adding of the calcium containing chemical occurs in a dust mixer and/or a concentrated liquid cistern, wherein the mixer or cistern are located immediately upstream of the location for combusting the waste liquor.

5. The method according to claim 1 wherein the calcium containing chemical is added immediately prior to combusting the concentrated waste liquor.

6. The method according to claim 5 wherein the adding of the calcium containing chemical occurs in a dust mixer and/or a concentrated liquid cistern, wherein the mixer or cistern are located immediately upstream of the location for combusting the waste liquor.

7. The method according to claim 1, 2, 5, 6, 3, or 4 wherein the calcium containing chemical is lime mud.

8. The method according to claim 7 wherein the lime mud is dry and is obtained from an electrofilter downstream of a lime kiln.

9. The method according to claim 7 wherein the lime mud is in a slurry form.

* * * * *